Nov. 17, 1959     E. R. MITTELMAN     2,913,685
CAVITY RESONATOR STRUCTURE

Filed April 5, 1954

INVENTOR
Edward R. Mittelman.
BY
F. E. Browder
ATTORNEY

United States Patent Office 2,913,685
Patented Nov. 17, 1959

2,913,685

CAVITY RESONATOR STRUCTURE

Edward R. Mittelman, Baltimore, Md., assignor to Westinghouse Electric Corporation, East Pittsburgh, Pa., a corporation of Pennsylvania Application April 5, 1954, Serial No. 421,131

3 Claims. (Cl. 333—83)

This invention relates to ultra-high frequency tube structures, and, more particularly, to cavity resonator structures utilized in a hollow wave guide system.

It is an object of my invention to provide a cavity resonator structure providing a flexible mounting support for the cavity resonator envelope within a hollow wave guide system.

It is another object to provide an improved arrangement for mounting a cavity resonator structure within a wave guide system to eliminate mechanical distortion in normal handling, mounting and use of the apparatus.

It is another object to provide a cavity resonator structure which provides a flexible mounting for the cavity resonator envelope having small leakage over a wide frequency range.

These and other objects are effected by my invention as will be apparent from the following description taken in accordance with the accompanying drawing, throughout which like reference characters indicate like parts, and in which.

Figure 1:
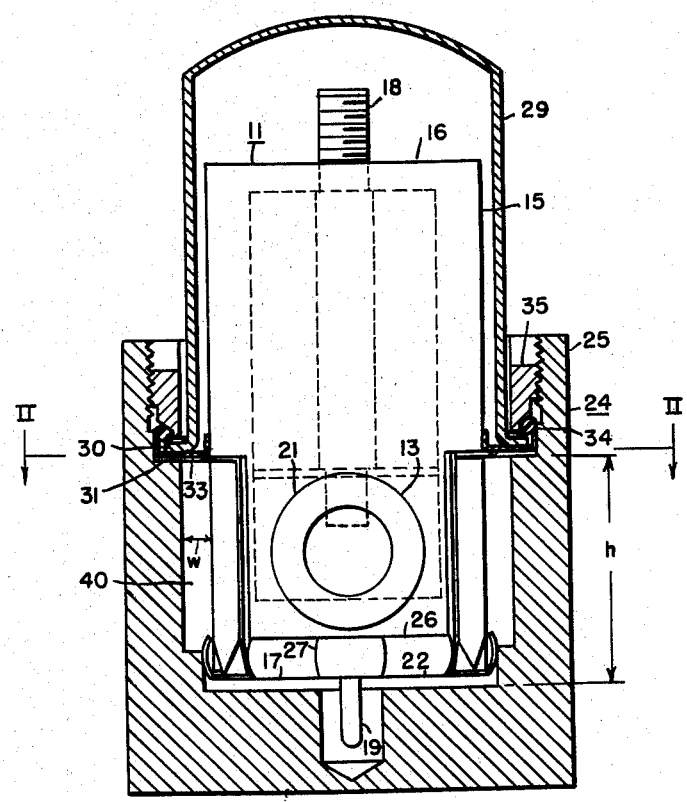
Figure 1 is a front view of a cavity resonator structure partly in section embodying my invention.

Referring in detail to the drawing, a cavity resonator envelope 11 is provided within a cylindrical member 15 of a suitable conductive material. The cylindrical member 15 is provided with closing end plates 16 and 17 on the top and bottom thereof, respectively. A tuning rod 18 projects through the top closing plate 16 and is provided for adjustment of the resonant frequency of the cavity space 13. A tubulation 19 is provided through the bottom plate 17 substantially at the center thereof for the evacuation of the cavity resonator envelope 11.

A pair of openings 21 are provided within the wall of the member 15 substantially diametrically opposite each other through which electromagnetic energy may be introduced into the cavity resonator space 13 and be extracted therefrom. As is customary in such devices, a suitable transmissive material, such as glass, is placed across the openings 21 so as to permit the evacuation of the cavity resonator envelope 11.

A special support 24 is provided, whereby the cavity resonator envelope 11 may be mounted within a suitable system, such as a hollow wave guide system. The support 24 is shown as a square, generally cup-shaped member 25, and a substantial portion of the cavity resonator envelope 11 is enclosed within the interior portion of the support 24. An inverted cup-like member 29, having a greater diameter than the cavity resonator envelope 11, covers the envelope 11 as a protective cover with the bottom edge attached to the interior surface of the support 24.

A disc member 26, with an up-turned flange 27, is inserted over the bottom surface of the cavity resonator envelope 11. An aperture is provided at the center of the disc 26 for the tubulation 19 so that the disc 26 will be adjacent to the end plate 17. The disc 26 is positioned adjacent to the bottom closing plate 17. The flange 27 about the periphery of the disc 26 is crimped inward, so that when the cavity resonator envelope 11 is inserted into the support 24, the flange 27 will engage the inner surface of the support 24 adjacent to the bottom surface 22 and the cavity resonator envelope 11 so as to partially position and retain the envelope 11 within the support 24. The disc member 26 with flange 27 is made of a thin resilient material so as to permit flexibility of mounting of the cavity resonator envelope 11 within the support 24. A small opening is provided in the bottom surface 22 of the opening in the support member 24 for the tubulation 19, so that the bottom plate 17 of the cavity resonator envelope 11 will be near to the bottom surface 21 of the cylindrical opening separated only by the disc 26 of the support member 24.

A flexible mounting ring 33 is also provided for the cavity resonator envelope 11 within the support 24. The mounting ring 33 is positioned above the openings 21 in the envelope 11. The inner periphery of the mounting ring 33 is in contact with the outer periphery of the cavity resonator envelope 11. The outer periphery of the ring 33 rests on a shoulder 31 of the interior surface of the support 24.

An outturned flange 30 is provided on the edge of the inverted protective cover 29 which also rests on the shoulder 31 and is supported thereby. A gasket 34 of suitable material, such as synthetic rubber, is positioned on the shoulder 31 after the ring 33 and the protective cover 29 are placed thereon. A nut 35 which is threadedly interconnected with the upper portion of the inner surface of the support 24 is screwed down and clamps the protective cover 29 and the ring 33 securely to the support 24.

Thus, the cavity resonator envelope 11 is supported non-rigidly within the support 24 by the flexible annular mounting ring 33 and the flange 27 of the flexible mounting disc 26. The flexible mounting disc 26 is preferably formed with the periphery 27 split in sections to give added flexibility.

The support 24 also has suitable openings provided therein, which are aligned with the openings 21 in the cavity resonator envelope 11 for the transmission of energy through the cavity resonator structure.

It is apparent in the mounting arrangement described above, the mechanical stresses and strains ordinarily associated with installing a tube in the hollow wave guide system, as well as those caused by vibration and thermal expansion and contraction of parts of the system, are in no way applied to the cavity resonator envelope, but are absorbed by the flexible support mountings consisting of the annular ring 33 and the mounting disc 26.

In obtaining such a non-rigid support of the cavity resonator envelope 11, an annular dielectric path 40 is provided between the inner surface of the support 24 and the cavity resonator envelope 11. The annular dielectric path 40 thus formed is undesirable from the aspect of the leakage transmission of energy along the outside surface of the cavity resonator envelope 11 rather than through the cavity resonator 13. The space 40 is necessary, however, to permit flexible mounting of the cavity resonator envelope 11 within the support member 24.

The extent to which this region 40 will transmit energy as a wave guide depends upon the degree of coupling of a particular mode of the electromagnetic waves in this annular region 40 to the mode impressed upon the cavity resonator structure and the cut-off frequency of a particular mode in this annular space compared to the frequency band being used. There are two type modes known as the E and H, referring respectively to those modes which do or do not have a component of electrical field in the direction of the propagation of energy. The transmission of the lowest H mode requires that the width of the annular region 40 shown as the dimension $w$ in Figs. 1 and 2 must be at least one half a wave length in free space. Thus, by making $w$ considerably less than one half wave length in free space, no energy will be transmitted in an H mode without extremely large attenuations.

The transmission of the E mode is determined by at least two dimensions of the annular region 40. In the first place, energy may be transmitted in the E mode if the circumference of the mean diameter of the annular space 40 about the cavity resonator envelope 11 is greater than the free space wave length of the energy impressed thereon. The other important dimension which determines the cut-off frequency of a particular E mode is dependent on the height shown as the dimension $h$ in Fig. 1 of the annular space 40 between the cavity resonator envelope 11 and the support 24. Additional details as to the construction of the support 24 and envelope 11 may be found in U.S. Patent 2,584,717, issued February 5, 1952, to the same assignee.

As explained in the U.S. Patent 2,584,717, if the cavity resonator envelope 11 is properly assembled and exactly spaced, the off resonant attentuation is high. However, it has been found that when the tubes are made in production quantities, that many tubes are not properly spaced and consequently the off resonant attenuation is much too low.

I have found that by shorting the physical center of the tube or cavity resonator envelope 11 to the support 24, it is possible to obtain sufficient off resonant attenuation. This short is positioned at the midpoint of the $h$ dimension shown on Fig. 1 and effectively divides the resonant volume of the annular space 40 and also shorts the E mode of the transmitted modes.

Figure 3:
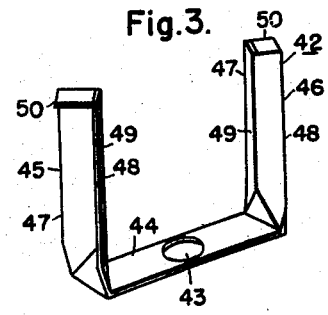
Fig. 3 is a perspective view of a portion of the structure shown in Figs. 1 and 2.

Referring in detail to Fig. 3, I have shown in perspective a possible structure to be utilized in carrying out my invention. A shorting member 42 of a resilient material, such as beryllium copper, having a thickness of about .003 inch is provided for the region 40. The strip of material is bent or formed into the U-shaped structure 42 shown in Fig. 3. The resulting member 42 shown in Fig. 3 is provided with an aperture 43 substantially at the center of the strip 42 which engages over the exhaust tubulation 19 so as to aid in positioning of the member 42 when mounted in the cavity resonator structure. The yoke or center portion 44 of the U-shaped member 42 is of a length slightly greater than the outside diameter of the bottom portion of the cavity resonator envelope 11 so that the side arms 45 and 46 will extend upward along the side of the cavity resonator envelope 11 and be substantially parallel to the axis of the cavity resonator envelope 11. The side arms 45 and 46 are creased lengthwise for substantially the entire length so that two contacting edges 47 and 48 will face outward so as to engage or dig into the surface of the support member 24 while the bent inner contact or crease edge 49 on the inner side of the arms 44 and 45 will face inward and contact or dig into the surface of the cavity resonator envelope 11. A tongue 50 is provided on the end of each arm which may be integral with the arms 45 or 46, as shown in Fig. 3. The tongue 50 is formed by bending over 90° an extension of a part of the arm 45 or 46 on one side of the creased edge 49 toward the outside. The length of the extension 50 is substantially equal to the width of the portion of the arm 45 or 46 on the opposite side of the crease edge 49.

In assembling the shorting member 42 within the cavity resonator structure, the shorting member 42 is fitted over the bottom of the cavity resonator envelope 11, with the aperture 43 fitted over the tubulation 19.

The disc member 26 is then fitted over the bottom of the cavity resonator envelope 11 and the resiliency of the crimped flange 27 retains the member 42 on the envelope 11.

The positioning of the member 42 about the periphery of the envelope 11 may be obtained by removing a section of the crimped flange 42. The envelope 11 with the disc 26 and shorting members 42 may then be inserted into the support 24. The shorting member 42 by the legs 45 and 46 will short the support 24 and the cavity resonator envelope 11 substantially the entire length of the arms 45 and 46.

The tongues 50 may also rest on the shoulder 31 of the support member 24 and be retained in position on the shoulder 31 by the locking nut 35. The locking of the tongue 50 on the arms 45 and 46 insures against slippage or deformation under vibration. Thus the shorting member 42 as assembled is held in position by the exhaust tubulation 19, the flange 27 of the disc member 26 and the locking nut 35, while the edges 47, 48 and 49 of the arms 45 and 46 engage the tube 11 and support 24.

The shorting member 42 has been found to be more satisfactory than a simple shorting spring or device positioned at the exact center of the tube. It was found with a simple short at the center of the tube, that power would still leak through. It was also found that as the spring clip and the tube wall became tarnished, the attenuation decreased. It was found with my device the attenuation for all frequencies was well above 30 decibels and was not subject to distortion by handling and was not affected by vibration.

Figure 2:
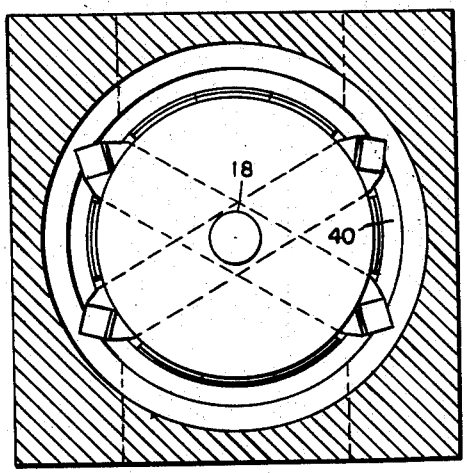
Fig. 2 is a view taken along line II—II of the structure shown in Fig. 1.

The utilization of two or more shorting members 42 as shown in Figs. 1 and 2 is added protection in case one of the members 42 is physically damaged in assembly.

It is also obvious that the resilient arms 45 and 46 will aid in the positioning and support of the cavity resonator envelope 11 within the support 24.

While I have shown my invention in several forms, it will be obvious to those skilled in the art that it is not so limited, but is susceptible of various other changes and modifications without departing from the spirit and scope thereof.

I claim as my invention:

1. In a cavity resonator structure, a closed hollow cylindrical member providing a resonant cavity, means for introducing energy into said cavity, means for extracting energy from said cavity, a support member surrounding at least a portion of said hollow cylindrical member and being spaced therefrom, a metallic flexible U-shaped shorting member having a pair of arms extending along the portion of said hollow cylindrical body occupied by said resonant cavity, each of said arms having an elongated inner contact portion making contact with said elongated cylindrical hollow member and having an elongated outer contact portion making contact with said support member thereby providing both electrical and physical connection between said support member and said hollow cylindrical member substantially along the portion of the length of said cylindrical member occupied by said resonant cavity.

2. In a cavity resonator structure, a hollow cylindrical body provided with a resonant cavity positioned at one end thereof, means for introducing energy into said cavity, means for extracting energy from said cavity, a support member surrounding the portion of said hollow cylindrical body containing said resonant cavity, said support member being spaced from said hollow cylindrical body, a metallic flexible U-shaped shorting member having a pair of arms extending along the portion of said hollow cylindrical member in which said resonant cavity is positioned, each of said arms having an inner contact portion making contact with said hollow member and an outer contact portion making contact with said support member thereby providing both electrical and physical connection between said support member and said hollow cylindrical member, said U-shaped shorting member being attached to the end of said hollow cylindrical member in which said resonant cavity is positioned.

3. In a cavity resonator structure, a closed hollow cylindrical member providing a resonant cavity, means for introducing energy into said cavity, means for extracting energy from said cavity, a support member surrounding at least a portion of said hollow cylindrical member and being spaced therefrom, a metallic flexible U-shaped shorting member having a pair of arms extending along the portion of said hollow cylindrical body occupied by said resonant cavity, each of said arms having an elongated inner contact portion making contact with said elongated cylindrical hollow member and having an elongated outer contact portion making contact with said support member thereby providing both electrical and physical connection between said support member and said hollow cylindrical member substantially along the portion of the length of said cylindrical member occupied by said resonant cavity, each of said arms having a V-shaped cross section.

References Cited in the file of this patent

UNITED STATES PATENTS

| | | |
|---|---|---|
| 2,451,876 | Salisbury | Oct. 19, 1948 |
| 2,454,761 | Barrow | Nov. 30, 1948 |
| 2,573,713 | Kannenberg | Nov. 6, 1951 |
| 2,584,717 | Alpert | Feb. 5, 1952 |
| 2,761,116 | Dijkgraff | Aug. 28, 1956 |